(12) United States Patent
Kim et al.

(10) Patent No.: US 6,525,783 B1
(45) Date of Patent: Feb. 25, 2003

(54) VIDEO DECODING SYSTEM

(75) Inventors: Jin-Kyeong Kim, Kyungki-do (KR); Hwa-Young Lyu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/240,886

(22) Filed: Feb. 1, 1999

(30) Foreign Application Priority Data

Feb. 3, 1998 (KR) .............................................. 98-2941

(51) Int. Cl.$^7$ ................................................ H04N 7/18
(52) U.S. Cl. .................................. 348/714; 375/240.23
(58) Field of Search ...................... 375/240.01–240.29; 348/712–718

(56) References Cited

U.S. PATENT DOCUMENTS 5,963,222 A * 10/1999 Cheney et al. .............. 345/516
6,067,321 A * 5/2000 Lempel ....................... 375/240
6,111,913 A * 8/2000 Murdock et al. ............ 375/240
6,256,348 B1 * 7/2001 Laczko et al. ........... 375/240.15
6,266,104 B1 * 7/2001 Kim ............................ 348/714

* cited by examiner

Primary Examiner—Andy Rao
(74) Attorney, Agent, or Firm—Fleshner & Kim, LLP

(57) ABSTRACT

A video decoding system is disclosed with a increased efficiency by allowing a parallel processing when high speed is required and/or a serial processing when high speed is not required, and by effectively managing memory requests from different system blocks. The video decoding system according to the present invention includes a variable length decoder, an inverse quantizer, an inverse scanner, an inverse discrete cosine transform unit, a motion compensation unit, a half pel prediction unit, and a memory controller, allowing control of the processing time depending upon a video bit stream compression method.

15 Claims, 2 Drawing Sheets

VIDEO DECODING SYSTEM

BACKGROUND OF THE INVENTION

1. Field of the Invention

The present invention relates to a high definition television (HDTV) video decoder and more particularly to a video decoding system for decoding bit streams of motion picture experts group 2 main profile at high level (MPEG2 MP@HL).

2. Description of Related Art

Recently, digital TV broadcasting has attracted a great among of attention. Accordingly, extensive research for compression and transmission of digital video data have been made to provide distinct pictures of high definition through television receivers at home. As a result, a MPEG2 has been developed which is mainly used as an algorithm for compressing video signals.

Even with the existing technology, transmitting digital data of high quality video had been difficult due to it's high data rate. Because the MPEG2 allows a very high compression rate, for example 1/40 to 1/60, utilizing the MPEG2 algorithm, research has been made to transmit digital data of high definition to TV receivers at home via general broadcasting channels. However, to view the digital data, a digital TV receiver requires a video decoder to reconstruct the original high definition video data from the received compressed data. Particularly, the speed necessary in the decoder to decode the high definition video signals is five or six times the speed of a usual video decoder. Also, greater amount of memory capacity is required to decode. the high definition video signals.

Figure 1:
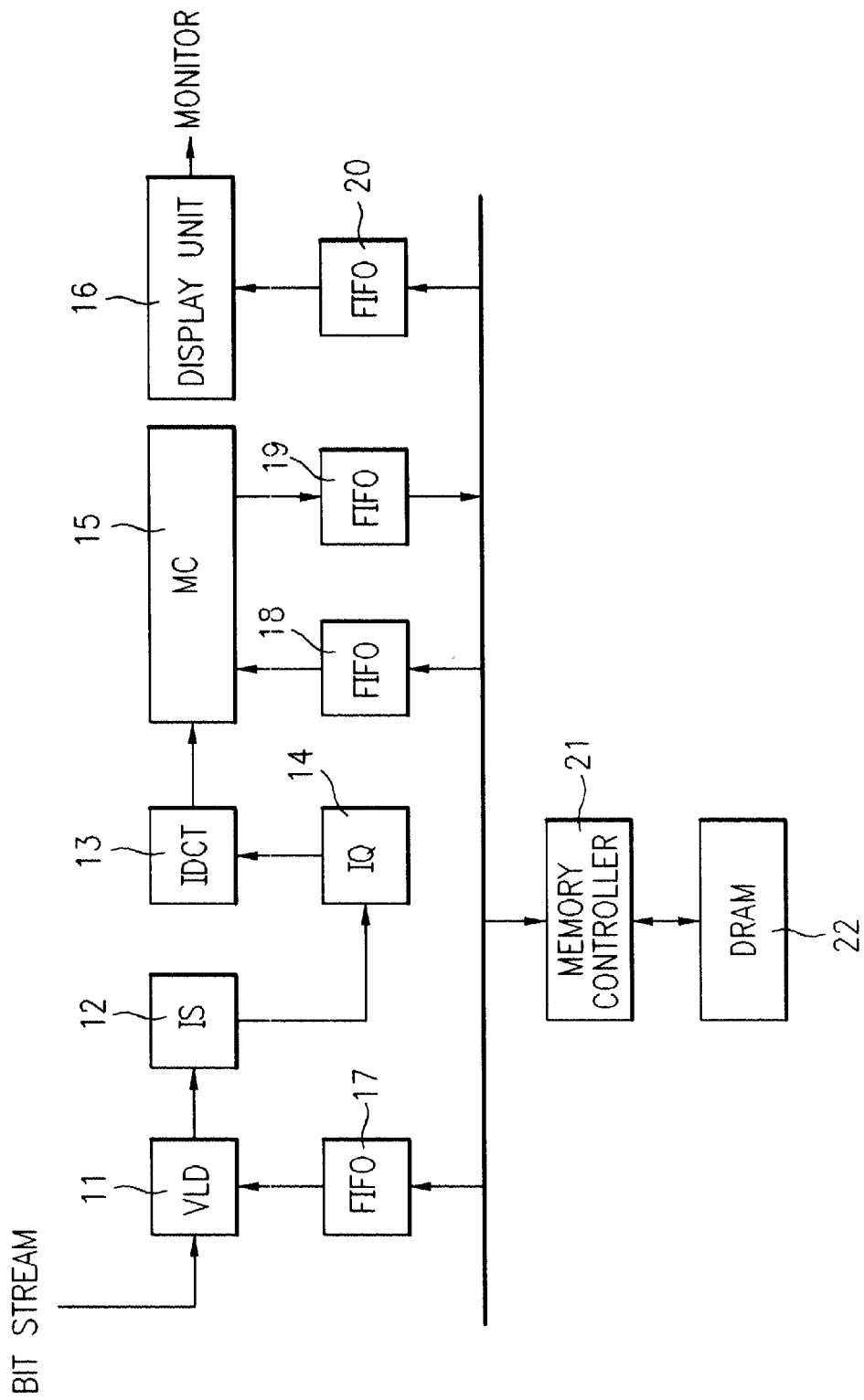

FIG. 1 is a block diagram of a conventional video decoder for processing video signals having a normal resolution in which the compressed video data is transmitted at a rate of 15 MBytes per second.

When a zig-zag scan coded video bit stream is serially input to the decoder, it is variable length decoded at a variable length decoder (VLD) 11 and separated into motion vectors, a quantization value, and discrete cosine transform (DCT) coefficients. Through an inverse scanner (IS) 12 and an inverse quantizer (IQ) 13, a value of the DCT coefficients output from the VLD 11 is transmitted to an inverse discrete cosine transform (IDCT) unit 14.

The DCT coefficients are decoded into a run/level form at the VLD 11. Namely, a DCT block comprises of 8 by 8 non-zero coefficients such that the output of the VLD 11 is the level data indicating the amplitude of the non-zero coefficients and the run data indicating the number of zeros inserted between the coefficients. The run/level pairs are sequentially converted into 64 DCT coefficients through a run/level decoding and output to the IS 12. In order to improve efficiency of the run/level code, the 8 by 8 coefficients are decoded in the form of zig-zag scanning in which low frequency elements are primarily transmitted. Because the 8 by 8 coefficients decoded in such form, the IS 12 converts the zig-zag scan into a raster scan.

The IQ 13 dequantizes the inverse scanned 64 DCT coefficients according to the quantization value and outputs the dequantized data to the IDCT unit 14. The IDCT unit 14 performs the IDCT with respect to the dequantized DCT coefficients and outputs the IDCT coefficients to a motion compensation unit 15. The motion compensation unit 15 combines the, data compensated by the motion vectors from the VLD 11 with the IDCT data to reconstruct the original image and outputs the reconstructed image to a display unit 16. After rearranging the data according to a picture type if necessary, the display unit 16 outputs received data for viewing.

During the decoding process., an external memory, for example, a dynamic RAM (DRAM) 22, is utilized as the frame memory. The DRAM 22 is generally divided into reading and writing of a bit stream for variable length decoding, reading of data necessary for the motion compensation, and writing and reading decoded video data to be displayed. Also, the VLD 11, MC 15, and display unit 16 has at least one first input first output (FIFO) 17~20 for temporarily storing data to prevent data collision on a bus, and for transmitting and receiving data through a memory controller 21.

A single memory may be utilized for multiple functions if a plurality of memory access requests can be managed and processed. Because the request signals of each block to access the memory access are necessary for the video decoding, the signals must be well controlled to enhance the decoding efficiency. To control the signals, the memory controller 21 divides the access time for performing each function, usually with respect to a macroblock.

Moreover, the bit streams are not uniformly compressed by one specified method, but are compressed according to the characteristics of the corresponding macroblocks. However, the volume of data to be processed is different at for each block and unnecessary memory access may be allocated by assigning a fixed access time, resulting in a deterioration of efficiency. Additionally, the conventional video decoder shown in FIG. 1 may be appropriate for processing a small amount of data, but its processing speed is insufficient for processing data of a HDTV decoder which involves processing a great amount of data.

Particularly, the decoding of MPEG2 MP@HL video data involves an amount of data approximately 6 times greater than the amount involved in the decoding of normal resolution video data. Thus, the data must be processed at a rate of more than 93 Mbytes per second. Accordingly, a HDTV decoder must process data at a speed 6 times faster than the conventional video decoder as shown in FIG. 1, and the memory capacity and data transmission speed must also be increased proportionately to the increased speed.

Most of the DCT coefficients in a compressed bit stream are 0, allowing the VLD 11 to decode one block within 5 to 6 clocks. However, a run/level decoder generate the 64 DCT coefficients by inserting zeros in the appropriate places and requires 64 clocks. As a result, the VLD 11 mostly remains idle while the run/level decoder generates the DCT coefficients, thereby creating an inefficiency.

If a conventional video decoder implemented to process the HDTV video data, the VLD, run/level decoder, inverse scanner, and IQ must operate at a maximum clock of 94 MHz. However, this clock frequency too high and decoding cannot be performed without undue burden on the hardware. Moreover, the inverse scanning is serially performed, requiring the internal memory writing and reading to perform at very high speed.

SUMMARY OF THE INVENTION

Accordingly, an object-of the present invention is to solve at least the problems and disadvantages of the related art.

An object of the present invention is to provide a video decoding system which allows a parallel processing when high speed is required and/or a serial processing when high speed is not required.

Another object of the present invention is to increase the memory access speed in a video decoding system by utilizing a synchronous DRAM (SDRAM) as a frame memory and by effectively managing the memory requests from different system blocks.

A further object of the present invention is to provide a video decoding system which minimizes the necessary time for memory access for motion compensation.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a video decoding system according to the present invention generally includes a VLD, an IQ, an IS, an IDCT unit, a motion compensation unit, a half pel prediction unit, and a memory controller, allowing control of the processing time depending upon a video bit stream compression method.

BRIEF DESCRIPTION OF THE ATTACHED DRAWINGS

Figure 2:
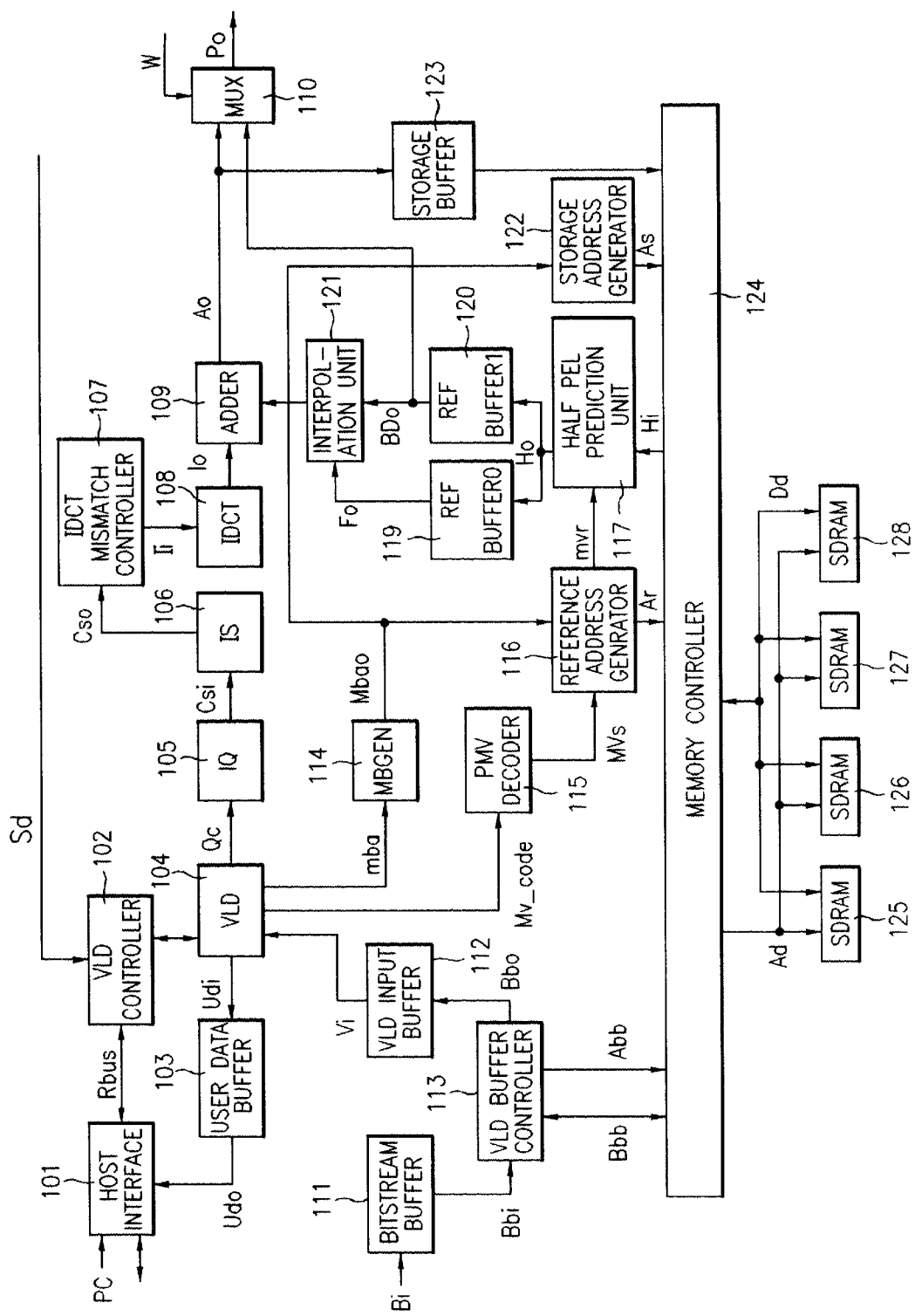

The invention will be described in detail with reference to the following drawings in which like reference numerals refer to like elements wherein:

FIG. 1 is a block diagram of a conventional video decoding system in the background art; and FIG. 2 is a block diagram of a video decoding system according to the present invention.

DETAILED DESCRIPTION OF PREFERRED EMBODIMENT

As discussed above, the video decoding system according to the present invention generally includes a VLD, an IQ, as IS, an IDCT unit, a motion compensation unit, a half pel prediction unit, and a memory controller. Particularly, the IQ of the video decoding system according to the present invention performs dequantization of coefficients passing the VLD without a conventional run/level decoding. Thus, the IQ does not dequantize the zeros.

Utilizing the location information of the VLD coefficients, the inverse scanner of the video decoding system according to the present invention generates addresses in a parallel format to write and stores the dequantized DCT coefficients in the generated addresses within its memory. Thus, the inverse scanner simultaneously performs an inverse scanning and converts the serial data into parallel data. The inverse scanner also fills the contents of the memory with zeros before writing the non-zero coefficients of a block to the memory to generated the 64 coefficient block.

The half pel prediction unit of the video decoding system according to the present invention performs, in parallel, a horizontal and a vertical half pel interpolation with respect to the parallel data from the SDRAM. The motion compensation unit of the video decoding system according to the present invention has a reference buffer for reading and storing the data for the motion compensation from the SDRAM, the buffer comprising a forward and a backward buffers. The motion compensation unit adjusts the writing and reading addresses for the reference buffer depending upon a motion compensation type and a DCT type of a macroblock such that the data of the buffer is output in order in which the data is output from the IDCT unit.

A display unit of the video decoding system according to the present invention outputs data in units of macroblocks. The display unit outputs a current reconstructed picture if a picture to be decoded is an "I" intra-picture or a "P" predicted picture. Alternatively, the display unit outputs a picture which has been previously decoded and stored in the frame memory if the picture is a "B" bidirectional interpolated picture.

A memory controller of the video decoding system according to the present invention controls the SDRAMS to allow access to the data for variable length decoding, motion compensation, and display and sets a memory access order enabling the system to efficiently perform the decoding. The SDRWM of the video decoding system according to the present invention comprises a portion for storing the video bit stream and a portion for storing two frames, and each frame of memory further comprises two banks. The SDRAM allocates different bank addresses to a top and a bottom data slices and stores data of an even slice in an even bank and data of an odd slice in an odd bank. Moreover, the memory controller also sets a mode register when periodically refreshing the SDRAM, thereby allowing a stable operation of the SDRNM.

FIG. 2 shows a preferred embodiment of the video decoding system according to the present invention comprising: a bit stream buffer 111 temporarily storing input video bit streams (Bi); a VLD buffer controller 113 writing data (Bbi) from the bit stream buffer 111 to SDRAMs 125~128 and reading bit streams (Bbb) stored in the SDRAMs 125~128 through a memory controller 124; a VLD input buffer 112 temporarily storing data (Bbo) received from the VLD buffer controller 113; a VLD 104 variable length decoding the bit stream (Vi) received from the VLD input buffer 112 according to the MPEG2 syntax; a user data buffer 103 storing user data (Udi) from the VLD decoded data; an IQ 105 receiving the DCT coefficients and the location information of the coefficients within a DCT block from the VLD decoded data and dequantizing the DCT coefficients; a macroblock address generator (MBGEN) 114 receiving macroblock addresses (mba) from the VLD decoded data and generating addresses of data to be stored in the SDRAM 125~128; a previous motion vector (PMV) decoder 115 receiving motion vector codes (Mv_code) from the VLD decoded data and decoding motion vectors; and a VLD controller 102 determining a time point for decoding a picture in response to an external display sync (sd) signal and controlling the VLD 104 according to a value of a register selected through a host interface 101.

The video decoding system of the present invention further comprises: a reference address generator 116 generating an address of the SDRAM (Ar) necessary for motion compensation utilizing both the address of a current macroblock (Mbao) produced by the macroblock address generator 114 and the motion vectors (MVs) from the PMV decoder 115; an IS 106 converting the dequantized data into parallel data while performing the inverse scanning; a half pel prediction unit 117 computing and extracting the data necessary for motion compensation from the reference data read from the SDRAM; a first and second reference buffers 119 and 120 storing half-pel predicted data; an interpolation unit 121 reading and processing data from the first and second reference buffers 119 and 120 according to a motion compensation type; an adder 109 combining in parallel the data output by an IDCT unit 108 and the data output by the interpolation unit 121 to reconstruct the image; an output multiplexer 110 selectively outputting either an output of the adder 109 or an output of the second reference buffer 120 depending upon a picture type; a memory buffer 123 temporarily storing the output of the adder 109 to newly store in a frame memory when the picture is an I or a P picture type; and a memory address generator 122 generating an address within the SDRAM where the decoded macroblock is stored, according to the macroblock address (Mbao).

For a frame memory, the SDRAM having an ability of high speed memory access is used, rather than a DRAM. In the preferred embodiment, four SDRAMs 125~128 are used, in parallel, to obtain a necessary memory bandwidth. The memory controller 124 controls the data input/output within the SDRAMs according to predetermined priority, thereby controlling the memory bus.

In the present invention, the input video bit stream (Bi) is temporarily stored in the bit stream buffer 111 and is written to the SDRAMs 125~128 through the VLD buffer controller 113. The bit stream stored in the SDRAMs 125~128 is also read by the VLD buffer controller 113 and temporarily stored in the VLD input buffer 112. Particularly, the VLD buffer controller 113 calculates the fullness of the SDRAMs 125~128 by comparing the amount of data written and the amount data read to/from the SDRAMS.

The VLD 104 reads the bit stream from the VLD input buffer 112 and decodes the data according to the MPEG2 syntax. The user data (Udi) from the decoded data is stored in the user data buffer 103. Among the variable length decoded data from the VLD 104, the macroblock address (mba) is output to the macroblock address generator 114 and the DCT coefficient (Qc) is output to the IQ 105 together with the information on the location of the DCT block coefficients. The motion vector code (Mv_code) used for decoding a motion vector is output to the PMV decoder 115.

The VLD controller 102 determines the point in time for decoding a picture in response to the display sync (sd) signal and controls the VLD 104 according to the selected register value transmitted from the host interface 101. The VLD controller 102 also reads an internal register value of the VLD 104 and outputs the read value to the host interface 101. The host interface 101 interfaces the internal signals of the microprocessor to exterior of the microprocessor through a Rbus by converting the internal signals into signals conforming to a protocol of an external bus.

The IQ 105 multiplies the DCT coefficients received from the VLD 104 by quantization matrix values and a quantization scale value. The VLD 104 sends non-zero coefficients to the IQ 105 together with the information regarding the macroblock number containing the coefficient and the location of each coefficient in the DCT block. The IQ 105 also receives the quantization matrix and the quantization scale from the VLD 104 for the dequantization. However, the VLD 104 does not decode run/level pairs, but directly outputs the DCT coefficients and their location information to the IQ 105.

The IQ 105 multiplies each of the 64 coefficients by the same quantization scale value and also multiplies the 64 coefficients by different quantization matrix values according to the DCT coefficient location in the 8 by 8 block. Thus, the IQ 105 reads the weights of the locations of each coefficient from the quantization matrix (not shown) based upon the location information and multiplies each coefficient by a corresponding weight read from the quantization matrix. Accordingly, the IQ 105 may simply dequantize the non-zero coefficients, thereby significantly shortening the operation time.

The PMV decoder 115 decodes the motion vectors using the motion vector code (Mv_code) received from the VLD 104 and outputs the decoded motion vectors to the reference address generator 1116. The macroblock address generator 114 receives addresses (mba) of each macroblock from the VLD 104 and generates an addresses (mbao) to be used for motion compensation. The generated addresses (mbao) is output to the reference address generator 116 and the storage address generator 122.

The macroblock address (mba) output from the VLD 104 does not necessarily increase by 1 as compared with an address of the preceding macroblock. For example, if macroblock skip occurs, the current macroblock address would increase by the number of the skipped macroblocks. Thus, the addresses of skipped macroblocks must be automatically generated. Additionally, if macroblocks and multiple slices are lost due to errors in the bit stream, a number of addresses equivalent the number of lost macroblocks must also be generated. Namely, when errors occur in the video bit stream, error hiding is performed to prevent the errors from appearing on a screen.

The reference address generator 116 generates a SDRAM address (Ar) based upon the current macroblock address and the motion vectors. The SDRAM address is necessary for reading a reference block used for the motion compensation from the SDRAM 125~128. The reference address generator 116 generates different addresses for the luminance signals and the chrominance signals. The addresses also have different values and occurrence orders depending upon a type of the motion compensation.

Also, the IS has an internal memory which includes a plurality of memories. While storing the serially received non-zero DCT coefficients (Csi) in the internal memory, the inverse scanner 106 converts the location information of each coefficient into the memory write addresses by way of a double buffering method. Particularly, each coefficient is sequentially written into the memory, but because the write addresses are formed in a parallel structure, the coefficients may be simultaneously read allowing a parallel output. Namely, the write addresses are produced commonly in the plurality of memories. However, by producing different write enabling signals, the input data is selectively written into the plurality of memories. On the other hand, the read addresses and read enabling signals are produced commonly in the plurality of memories for the simultaneous reading of the data. Thus, operations from the IDCT unit 108 to the motion compensation unit can be performed in parallel, thereby obtaining the desired processing speed.

Moreover, the non-zero coefficients, i.e. less than 64 coefficients, are input to the IS 106, but all 64 coefficients for one block must be output to the IDCT unit 108. Accordingly, the zero coefficients must be generated and placed into the appropriate locations within the block. Thus, the contents of the internal memory is initialized to a value of zero before writing non-zero coefficients according to the location information. As a result; the zeros are automatically inserted into the appropriate locations of the block during the reading of the data without requiring additional time for filling the empty locations of the block with 0.

Additionally, an IDCT mismatch controller 107 prevents an accumulation of errors caused by a mismatch between the data prior to DCT in an encoder and the decoded data after the IDCT in a decoder. The IDCT mismatch controller 107 performs this control in parallel, thereby increasing the amount of data output to the IDCT unit 108.

The half pel prediction unit 117 computes and extracts data necessary for the motion compensation from the reference data (Hi), read from the SDRAMs 125~128 based upon the motion vector value (Mnvr) received from the reference address generator 116. A data bus of the SDRAMs 125~128 outputs 8 bytes or 64 bits per clock. From the 64 bits, the bits corresponding to the motion vector values are read and the data necessary for the motion compensation are extracted for an interpolation in a horizontal or a vertical direction based upon the half pel information of the motion vectors. The interpolated data is stored in the first and second reference buffers 119 and 120.

The memory size of the first and second reference buffers 119, 120 may be reduced by interposing the half pel prediction unit 117 between a SDRAM and the first and second reference buffers 119, 120. During the half pel prediction, if 8 pixels are to be horizontally interpolated, 9 pixels are required for a comparison and if 8 pixels are to be vertically interpolated, 9 lines are required. However, since the half pel prediction unit 117 stores the half pel data in the first and second reference buffers 119, 120 after the half pel interpolation, the numbers of pixels and lines needed for the comparison are reduced, thereby reducing the buffer size.

The data output by the half pel prediction unit 117 is stored into the first and second reference buffers 119, 120 in units of 8 bytes. The addresses for storage are generated according to the type of the motion. compensation and the type of the DCT, thereby allowing the interpolation unit 121 to easily read the data from the first and second buffers 119, 120 in the same order as the order of data output by the IDCT unit 108. Accordingly, the video decoding system of the present invention does not need to implement a buffer after the IDCT unit 108 as in the conventional decoder to output the data in accordance with the DCT type.

Furthermore, the first and second reference buffers 119 and 120 store reference data for the motion compensation as well as the data to be output to a display unit. The first reference buffer 119 stores the forward reference data, and the second reference buffer 120 stores both the backward reference data and the display data. For a bidirectional motion compensation (B picture), the contents from the same address of both the first and second reference buffers 119 and 120 are simultaneously read and output to the interpolation unit 121. For an intra (I) or a predicted (P) picture, the data (Fo) of the first buffer 119 is output to the interpolation unit 121, and the data (BDo) of the second buffer 120 is output to both the interpolation unit 121 and the multiplexer 110. The data (BDo) is eventually output from the multiplexer 110 to a video display processor (VDP). The VDP (not shown) processes the data for display on a display monitor.

The interpolation unit 121 reads and interpolates the data (Fo, BDo) from the first and second reference buffers 119 and 120 according to the type of the motion compensation and outputs the processed data to the adder 109. For the bidirectional motion compensation, the interpolation unit 121 reads the data from both first and second reference buffers 119, 120 and interpolates the two data in parallel. To interpolate, the interpolation unit 121 reads the data from the first reference buffer 119 for the forward motion compensation and reads the data from the second reference buffer 120 for the backward motion compensation.

The adder 109 combines, in parallel, the output data (Io) from the IDCT unit 108 and the output data from the interpolation unit 121, and outputs the combined data (Ao) to the multiplexer 110 or the memory buffer 123. The multiplexer 110 selectively outputs in macroblocks either the data (Ao) or the data (BDo) depending upon the picture type. The multiplexer 110 selects the data. (Ao) of the adder 109 for the B picture type and selects the output data (BDo) of the second reference buffer 120 for the I or P picture types, thereby performining a frame reordering function. When there is no request for data from the VDP, the multiplexer 110 receives a wait signal (W) until the data is output.

The storage buffer 123 is not utilized for the B pictures, but for the I or P picture types, the storage buffer 123 temporarily stores the decoded data to update the data in the frame memory. The storage address generator 122 generates addresses in the SDRAM according to the macroblock address (mbao) for storing the decoded data in the SDRAM.

Upon simultaneously receiving a plurality of memory access signals, the memory controller 124 gives first priority to an urgent request signal and gives the next priority to a request signal with a low occurrence frequency. For example, the video decoder stores the input bit stream in the memory and must read the bit stream for the decoding. However, the bit stream is input consecutively and cannot be stopped and must be timely received in order to prevent data loss. Thus, a bit stream memory request is given the first priority.

The reference address generator 116 produces memory requests for the data to perform motion compensation and to display the data. Because the data to be displayed must be output at a predetermined cycle, the second priority is given to the request for the data to be displayed. The next priority is given to the memory request from the VLD. The data needed by the VLD 104 is compressed and is not large in volume, and such memory request occasionally occurs. The memory request for the motion compensation is not given any priority. The data used for the motion compensation is not only large in volume, but frequently occurs. Moreover, no significant problem arises even if the data for the motion compensation is delayed.

In the preferred embodiment, the priority to the memory access requests is assigned in the following order: write of bit streams before variable length decoding; read of data to be displayed; read of data for the variable length decoding; write of motion compensated data; and read of data for the motion compensation. Prioritizing the memory access requests solves the problem in the decrease of decoding speed caused by inefficient processing of memory requests. The memory controller 124 also sets a mode register whenever the SDRAM is periodically refreshed, thereby allowing a stable operation of the SDRAM.

As discussed above, the SDRAM 125~128 comprises a portion for storing the video bit stream and portions for storing two frames, and each of the frame memories further comprises two banks. A top and a bottom slices of the data have different bank addresses, wherein the data of an even slice is stored in an even bank and data of an odd slice is stored in an odd bank. When reading the data for the motion compensation from the SDRAM. the data of the two slices is read from the SDRAM by an interleaving access method to reduce the memory access time. The memory controller generates a signal for commanding a reading of the data for the motion compensation, extending over the two slices, from the memory by the interleaving access.

In summary, the video decoding system of the present invention would be effective in the designing of integrated circuits for both a HDTV and a digital TV receiver. As discussed above, the video decoding system of the present invention allows for the VLD to operate at a low speed while allowing for the IQ, inverse scanner, and IDCT unit to operate at a high speed, thus requiring less circuits and operation time than the conventional system. Accordingly, the present invention may be implemented in a HDTV video decoder for processing a great amount of data at high speed.

Also, the memory controller according to the present invention prioritizes the memory access requests to efficiently perform memory access, thereby increasing the interfacing speed with the frame memory and a high speed video decoding. Additionally, the present inventions gives different bank addresses to a top and a bottom data slices when assigning the SDRAM to the frame memory and reads the data extending over the two slices for the motion compensation from the SDRAM by an interleaving access method. Thus, memory access efficiency is further increased allowing the speed necessary for HDTV decoding.

Furthermore, the present invention performs a horizontal and vertical half pel interpolation in parallel with respect to the data from the SDRAM before storing the data in a buffer. As a result, the pixels and lines used for comparison are eliminated and not stored into the buffer, thereby decreasing the size of the buffer. Also, utilizing a reference buffer to read and store the data for the motion compensation, a buffer for outputting the data from the IDCT according to the DCT type is not required.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A video decoding system comprising:
   a variable length decode (VLD) processing unit receiving and variable length decoding an input bit stream, said VLD processing unit obtaining and outputting discrete cosine transform (DCT) coefficients and information on locations of the DCT coefficients in a DCT block, wherein the DCT coefficients are outputted without performing a run-level decoding by the VLD processing unit;
   an inverse quantizer (IQ) dequantizing the DCT coefficient according to the location information of the DCT coefficients;
   an inverse scanner (IS) inverse scanning the dequantized DCT coefficients output from the (IQ);
   an inverse discrete cosine transform (IDCT) unit inverse discrete cosine transforming of the inverse scanned DCT coefficients output from the IS;
   a motion compensation unit decoding motion vectors output by the VLD processing unit, performing half pel prediction according to the decoded motion vectors, and interpolating the half pel predicted data;
   a display unit reconstructing a picture by combining the output from the IDCT unit with the output from the motion compensation unit and outputting the picture;
   a frame memory storing input bit stream, data for motion compensation, decoded data, and data to be displayed; and
   a memory controller controlling memory requests from the VLD processing unit, the motion compensation unit, and the display unit for writing to and reading from the frame memory.

2. A system of claim 1, wherein the VLD processing unit comprises:
   a bitstream buffer receiving and temporarily storing the input bit stream;
   a VLD buffer controller sending a memory request for writing the bit stream from the bit stream buffer to the frame memory and sending a memory request for reading the bit stream from the frame memory, said VLD buffer calculating the amount of bit stream stored in the frame memory by comparing the amount of written data to the amount of read data;
   a VLD input buffer temporarily storing the read data by the VLD buffer controller; and
   a VLD variable length decoding the bit stream output by the VLD input buffer, obtaining and outputting the DCT coefficients and the information on locations of the DCT coefficients in a DCT block.

3. A system of claim 2, wherein the VLD processing unit further comprises:
   a user data buffer storing user data from the variable length decoded data;
   a host interface outputting a selected register value;
   VLD controller determining the point in time for decoding a picture in response to the display sync signal and controlling the VLD according to the selected register value from the host interface, said VLD controller reading an internal register value of the VLD and outputting the read value to the host interface.

4. A system of claim 1, wherein the IQ dequantizes the DCT coefficients by multiplying each DCT coefficient with a quantization matrix value corresponding to the location information of the DCT coefficients and with a quantization scale for determining a quantization step.

5. A system of claim 1, wherein the IS serially receives the dequantized DCT coefficients and, outputs in parallel the inverse scanned DCT coefficients.

6. A system of claim 5, wherein the IS comprises a plurality of memories and wherein said IS commonly produces write addresses in the plurality of memories, produces different write enabling signals for selectively writing data into the plurality of memories, and commonly producing read addresses and read enabling signals in the plurality of memories for a simultaneous reading of the data from the plurality of memories.

7. A system of claim 6, wherein the IS initializes the contents of the plurality of memories to zeros before writing the data into said memories.

8. A system of claim 1, further comprising an IDCT mismatch controller preventing in parallel, an accumulation of errors caused by a mismatch between the data prior to a discrete cosine transform in an encoder and the inverse discrete cosine transformed data.

9. A system of claim 1, wherein the motion compensation unit comprises:
   a motion vector decoder decoding the motion vector codes;
   a MBGEN generating an address used for the motion compensation in response to an address of each macroblock received from the VLD processing unit;
   a reference address generator generating a memory address based upon a current macroblock address received from the MBGEN and based upon the decoded motion vectors to read from the frame memory a reference block used for the motion compensation;
   a half pel prediction unit reading from the frame memory the data corresponding to the address received from the reference address generator and performing horizontal and vertical half pel prediction of the read data according to the decoded motion vectors; and an interpolation unit interpolating the half pel predicted data according to the picture type.

10. A system of claim 9, wherein the motion compensation unit further comprises:

a first reference buffer storing forward reference data output by the half pel prediction unit;

a second reference buffer storing backward reference data and the data to be displayed output by the half pel prediction unit; and wherein for interpolation, the interpolation unit simultaneously reads data from the same address of the first and second reference buffers if the picture type is for a bidirectional motion compensation, reads the data from the first reference buffer if the picture type is for a forward motion compensation, and reads the data from the second reference buffer if the picture type is for a backward motion compensation.

11. A system of claim 10, wherein the display unit comprises:

an adder reconstructing the picture by combining the inverse discrete cosine transformed data and an output from the interpolation unit; and a multiplexer selectively outputting data received from the adder if a picture type is a bidirectional interpolated picture and outputting data received from the second reference buffer if a picture type is an I or a P picture.

12. A system of claim 11, wherein the display unit further comprises:

a storage buffer temporarily storing the data output from the adder if the picture type is the I or the P picture; and a storage address generator generating an address in the frame memory for storing a macroblock from the storage buffer according to the macroblock address output by the MBGEN.

13. A system of claim 1, wherein the frame memory is an external memory which comprises at least one SRAM, the external memory having at least two banks and different bank addresses being assigned to top and bottom data slices, wherein the memory controller generates a signal to read the data for the motion compensation from the external memory by an interleaving access method.

14. A system of claim 1, wherein the memory controller periodically sets mode registers when refreshing the frame memory.

15. A system of claim 1, wherein the memory controller controls the writing to and reading from the frame memory by assigning priorities to the memory requests, and wherein a memory request for writing bit streams is assigned first priority, a memory request for reading data to be displayed is assigned second priority, and a memory request for reading of data for the variable length decoding is assigned third priority.

* * * * *